United States Patent Office 3,666,406
Patented May 30, 1972

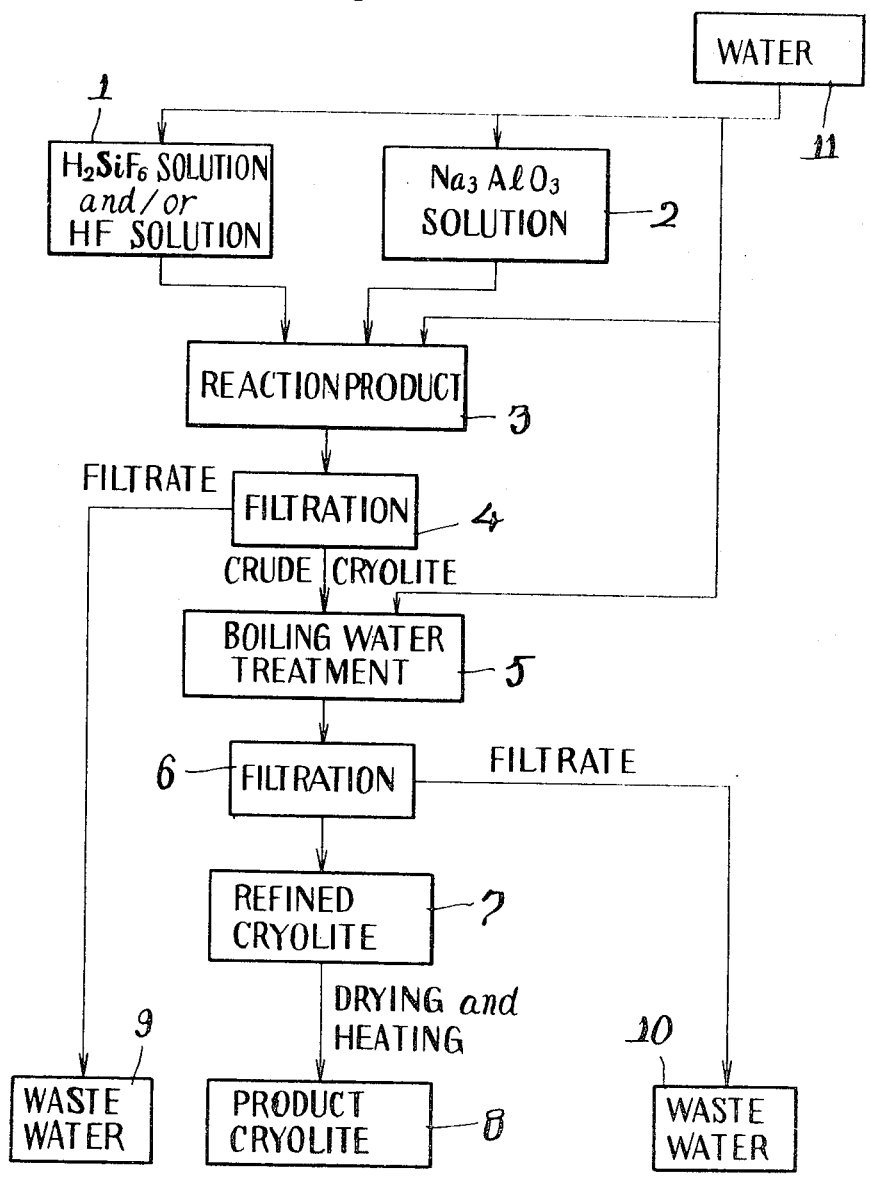

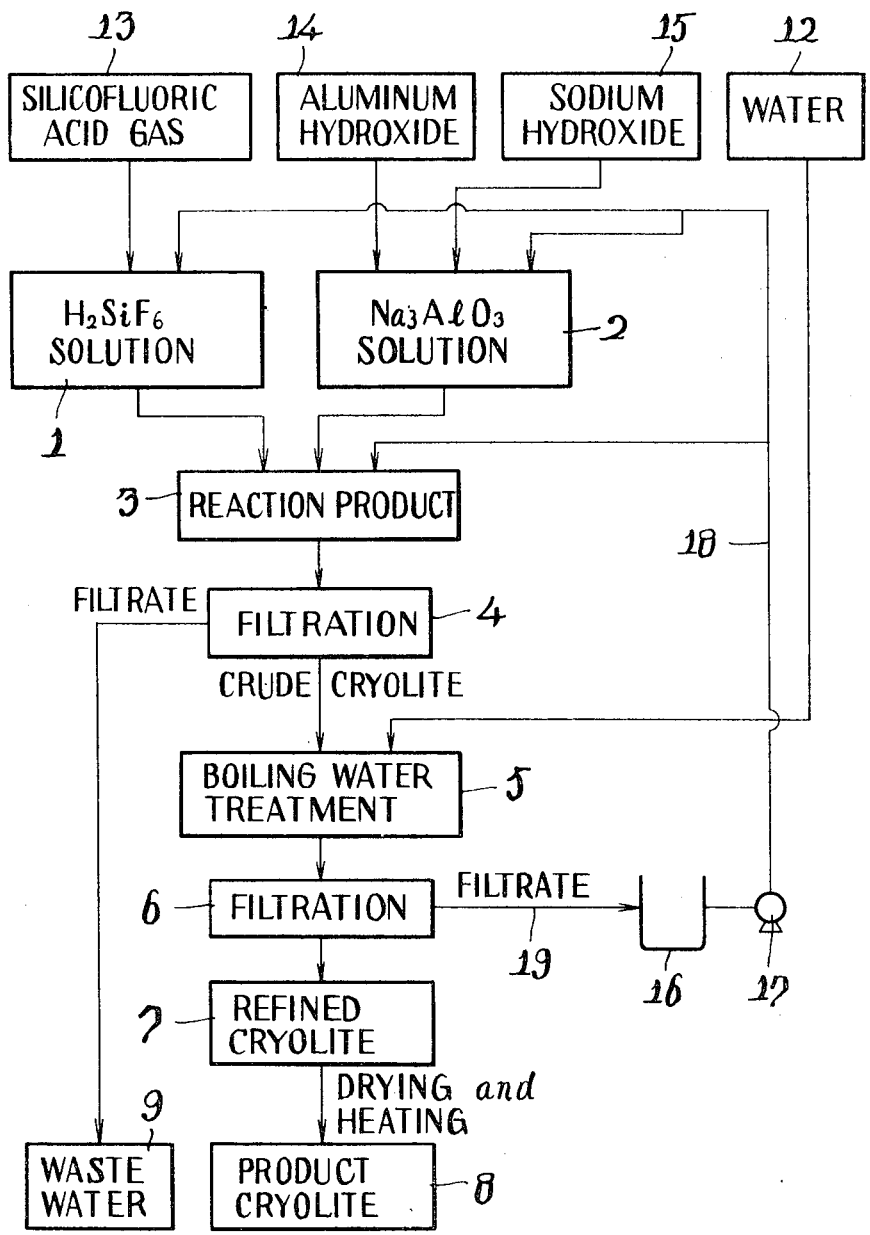

3,666,406
METHOD FOR MANUFACTURING CRYOLITE WITH HIGH PURITY
Yukio Kitano, Yokohama, Japan, assignor to Showa Denko Kabushiki Kaisha, Tokyo, Japan
Filed Aug. 28, 1970, Ser. No. 67,681
Claims priority, application Japan, Sept. 1, 1969, 44/68,677; July 21, 1970, 45/63,220
Int. Cl. C01f 7/54
U.S. Cl. 23—88  2 Claims

ABSTRACT OF THE DISCLOSURE

Impure hydrofluoric acid or hydrosilicofluoric acid containing phosphoric acid, silicic acid, sulfuric acid, iron and so forth or a mixture of such acids is reacted with the aqueous solution of sodium aluminate at a temperature at or below 55° C. The resulting crude cryolite is subjected to refining with boiling water to remove impurities. Thus, a highly pure cryolite is manufactured.

BACKGROUND OF THE INVENTION

This invention relates to a method for the manufacture of cryolite with high purity. More particularly, this invention relates to a method for the manufacture of highly pure cryolite, which method comprises the steps of causing impure hydrofluoric acid or hydrosilicofluoric acid containing phosphoric pentoxide, silicic acid, sulfuric acid, iron and so forth or a mixture of such acids to react with the aqueous solution of sodium aluminate at a temperature below about 55° C., filtering the resultant solution containing therein cryolite thereby obtaining crude cryolite and subjecting the said crude cryolite to refining with boiling water. The term "cryolite" as used in the present specification refers not only to highly pure cryolite but also to sodium-aluminum fluoride containing a small amount of chiolite. These are collectively referred to briefly as "cryolite" hereinafter.

The methods heretofore known for the manufacture of cryolite include the acid-radical method which is based on the addition of aluminum hydroxide and sodium hydroxide to hydrofluoric acid having high purity and the alkali method which is based on the addition of sodium aluminate to sodium fluoride solution. The method whereby synthetic cryolite is manufactured by alternately adding hydrofluoric acid or hydrosilicofluoric acid and sodium aluminate to hot water and the method by which manufacture of synthetic cryolite is accomplished by introducing hydrofluoric acid and sodium aluminate into hot water being agitated vigorously are also known to the art.

In connection with these known methods, however, no disclosure is made as to the removal of impurities present in hydrofluoric acid or hydrosilicofluoric acid or the removal of impurities present in the cryolite produced.

In a process for manufacturing cryolite by adding sodium aluminate to impure silicon-containing hydrofluoric acid or to hydrosilicofluoric acid, there is employed a method whereby the reaction solution is rendered acidic by adding a suitable amount of aluminum fluoride at the time sodium aluminate is added so that the silicon contained in the hydrofluoric acid or hydrosilicofluoric acid will be solubilized and the silicon content of the product cryolite will be decreased accordingly. This method can certainly decrease to some extent the amount of silicon which is found in the cryolite obtained as the final product. According to the experiment conducted by the inventor, however, this method is found to increase the phosphorus pentoxide content in cryolite where phosphorus pentoxide is contained in hydrofluoric acid or hydrosilicofluoric acid to be used as the raw material. From this, it follows that this method cannot produce cryolite having sufficiently high purity (in terms of impurities, the silicic acid content should not exceed 0.2% and the phosphorus pentoxide content 0.02% respectively) for use as an electrolyte in electrolyzing alumina to produce aluminum.

Hydrosilicofluoric acid recovered in the process of acid treatment of phosphorite or a mixture of hydrosilicofluoric acid with hydrofluoric acid contains phosphorus pentoxide. In manufacturing cryolite by using any of these acids as the raw material, therefore, there are generally employed reaction which are represented by the following chemical equations.

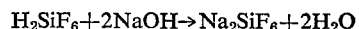

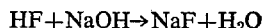

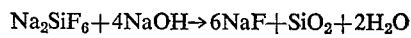

As the first step, the hydrofluoric acid or hydrosilicofluoric acid to be used as the raw material is caused to react with the aqueous solution of sodium hydroxide so as to precipitate the silicon component in the form of sodium silicofluoride having low solubility and separate phosphorus pentoxide. Then, sodium hydroxide is added to the precipitation product to induce separation between sodium fluoride and silicic acid. Thus, there is obtained sodium fluoride solution containing neither phosphorus pentoxide nor silicic acid. Cryolite with high purity is manufactured by allowing this sodium fluoride to react with aluminum salt (aluminum sulfate, for example).

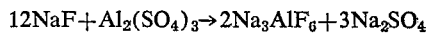

As mentioned, where cryolite with high purity is manufactured by using either hydrosilicofluoric acid containing phosphorus pentoxide and silicic acid or hydrofluoric acid as the raw material, there are inevitably involved various shortcomings, such as extremely complicated process and high cost of equipment.

A main object of the present invention resides in providing a method for manufacturing cryolite with high purity from impure hydrofluoric acid containing phosphorus pentoxide, silicic acid, sulfuric acid, iron and so forth or hydrosilicofluoric acid without involving such complicated process as mentioned above.

Another object of this invention is to provide a method for manufacturing cryolite with high purity by using low-grade water containing relatively large amounts of calcium, magnesium and so forth.

Other objects and characteristics of the present invention will become evident from the description which is given in further detail hereinafter with reference to the accompanying drawing.

BRIEF DESCRIPTION OF DRAWINGS

FIG. 1 is one flow diagram illustrating the process for the manufacture of cryolite with high purity according to the present invention.

FIG. 2 is another flow diagram illustrating the process for the manufacture of cryolite with high purity by using low-grade water according to the present invention.

DETAILED DESCRIPTION OF INVENTION

Referring to FIG. 1, hydrosilicofluoric acid or hydrofluoric acid or a mixture thereof being used as a raw material 1 is caused to react with the aqueous solution of sodium aluminate 2 and the reaction product 3 is separated by filtration 4. Thus, crude cryolite is obtained and the filtrate 9 is discarded. The crude cryolite is then subjected to refining at the stage 5, where it is treated with boiling water so that impure substances are eliminated and refined cryolite 7 is obtained through separation by means of filtration 6. The filtrate 10 is also discarded. The said refined cryolite 7 is further dried and heated to become the final product 8. Water 11 is supplied for dissolving the raw materials 1, producing sodium aluminate 2, adjusting the concentration of the reaction and washing crude cryolite, respectively.

For example, cryolite is synthesized when hydrosilicofluoric acid and sodium aluminate react as denoted by the following chemical equations.

$$H_2SiF_6 + Na_3AlO_3 \rightarrow Na_2SiF_6 + NaAlO_2 + H_2O \quad (1)$$
$$Na_2SiF_6 + NaAlO_2 + (n+2)H_2O \rightarrow Na_3AlF_6 + Si(OH)_4 \cdot nH_2O \quad (2)$$

The $Na_2SiF_6$ which is produced in the reaction of Formula 1 is of low solubility. Therefore, a small portion of $Na_2SiF_6$ coexists with $Na_3AlF_6$ while the reaction of Formula 2 is in progress and tends to be embraced in crystals of $Na_3AlF_6$. In such a case, it has been customary to raise the reaction temperature so as to increase solubility, increase reaction velocity and improve crystallizability. Consequently, the $Na_2SiF_6$ content in the final product can be decreased to some extent. On the other hand, however, silicic acid formed in the reaction of Formula 2 tends to be gelled and embraced in the final product where the reaction temperature is raised.

Generally, phosphorus pentoxide which is present in hydrosilicofluoric acid used as raw material also tends to be converted into aluminum phosphate or a similar compound and, in that form, embraced in cryolite as the final product. Moreover, where the aluminum component of sodium aluminate increases to surpass the aluminum/sodium ratio of 1:3, it gradually accelerates the formation of aluminum phosphate or a similar compound, increasing the amount of impurities in the final product. When the reaction temperature is raised, the formation of aluminum phosphate or a similar compound is accelerated, with the result that the amount of impurities in the product will increase all the more.

Synthetic cryolite is generally separated from the mother liquid by filtration or other similar treatment and thereafter washed with cold water or warm water. This washing operation is merely aimed at sufficiently washing mother liquid out of the precipitate. In the synthesized cryolite, silicic acid and phosphorus pentoxide are embraced to some extent as already mentioned. They cannot be eliminated from cryolite by such conventional method of washing.

On the basis of the observation that synthetic cryolite has solubility, minor as it may, to water and that sodium silicofluoride ($Na_2SiF_6$) and aluminum phosphate ($AlPO_4$) have respective degrees of solubility to water, the inventor has arrived at a discovery that when crude cryolite is treated with boiling water, impurities are elutriated readily and cryolite with high purity is obtained.

For the purpose of effectively elutriating impurities from synthesized cryolite through the treatment with boiling water, it suffices to prevent silicic acid, aluminum phosphate and other similar impurities from precipitating into the reaction solution and, in case they are already embraced in cryolite, to confer upon the cryolite a crystalline structure such that these impurities can be readily elutriated at the time of treatment with boiling water. This crystalline structure is required to have a properly mild state of aggregation (aggregate of crystals) from the microscopic point of view while being excellent from the microscopic standpoint.

The inventor pursued research with a view to conferring the aforementioned crystalline structure on the synthesized cryolite. Consequently, he has arrived at a discovery that the cryolite synthesized by causing hydrofluoric acid or hydrosilicofluoric acid containing phosphorus pentoxide, silicic acid and other impurities or a mixture of such acids to react with sodium aluminate at a low temperature not exceeding 55° C. possesses a structure like the one mentioned above.

Hydrosilicofluoric acid ($H_2SiF_6$ 5% and $P_2O_5$ 0.1%) and sodium aluminate solution ($Na_3AlO_3$ 5%) were maintained at pH 4.5–5.0 and allowed to react at temperatures varying from 10° C. to 100° C. to obtain different lots of crude cryolite. The different lots of crude cryolite were boiled further with water for one hour to refine them. Table 1 shows silicic acid contents and phosphorus pentoxide contents as determined for different lots of crude cryolite and of corresponding lots of refined cryolite.

TABLE 1

| Reaction temperature (° C.) | 10 | 20 | 30 | 45 | 55 | 60 | 80 | 100 |
|---|---|---|---|---|---|---|---|---|
| $SiO_2$ (percent): | | | | | | | | |
| Crude cryolite | 0.7 | 0.67 | 0.61 | 0.41 | 0.35 | 0.18 | 0.28 | 0.24 |
| Refined cryolite | 0.14 | 0.13 | 0.12 | 0.14 | 0.15 | 0.17 | 0.18 | 0.20 |
| $P_2O_5$ (percent): | | | | | | | | |
| Crude cryolite | 0.066 | 0.064 | 0.058 | 0.057 | 0.062 | 0.065 | 0.079 | 0.22 |
| Refined cryolite | 0.009 | 0.009 | 0.007 | 0.008 | 0.009 | 0.063 | 0.064 | 0.20 |

The preceding table clearly shows that the quantity of phosphorus pentoxide was nearly the same between the lots of cryolite synthesized at or below 55° C. and those synthesized at or above 60° C. but the quantity of silicic acid was far greater in the lots synthesized at or below 55° C. After the treatment with boiling water, however, both silicic acid and phosphorus pentoxide contents in the lots synthesized at or below 55° C. were by far smaller than those in the lots synthesized above 60° C. It is learned that the effect of removal is manifested particularly clearly with respect to phosphorus pentoxide.

This effect has been confirmed to occur not merely when hydrogen silicofluoride is used as a raw material but similarly when cryolite is synthesized by using hydrofluoric acid or a mixture of such acids.

Now, a description is made of the acidity of the reaction system at the time cryolite is synthesized. The silicic acid content increases as the acidity approaches to the acidic side beyond pH 3, and the phosphorus pentoxide content increases as the pH value approaches to the alkaline side beyond 6.5. Thus, the optimal range of acidity is pH 3–6.5.

The molar ratio of sodium to aluminum in sodium aluminate is desirably on the order of 1:3 and the rate of synthesis, in a batchwise operation for example, is desirably on such order that the concentration of produced cryolite will reach 50 g./l., or generally 30 g./l., in 5–20 minutes of reaction.

The crude cryolite thus synthesized has the shape of fine sand and can be filtered with extreme ease. Cryolite having high purity is obtained by treating the crude cryolite with boiling water so as to elutriate silicic acid, phosphorus pentoxide, sulfuric acid and iron therefrom, and filtering, drying and heating the resultant cryolite.

FIG. 1 shows an example wherein the filtrate 10 separated as a result of the treatment with boiling water is discarded. FIG. 2 illustrates a working example wherein the filtrate separated by the treatment with boiling water is refluxed to the raw materials, hydrosilicofluoric acid and sodium aluminate, and to the stage of process for synthesizing crude cryolite.

The quality of water which is supplied to the raw materials and to the stage of process for synthesizing crude cryolite has a direct and major effect upon the purity of cryolite to be synthesized. In other words, the contents of impurities, particularly, silicic acid and phosphorus pentoxide, in the synthesized cryolite tend to vary with the quality of water to be used.

Table 2 compares the contents of impurities in different lots of cryolite synthesized under the same conditions by using ion-exchanged water and underground water (Ca content 20 p.p.m., Mg content 10 p.p.m. and SiO' content 40 p.p.m).

TABLE 2

| Water used | Cryolite $Na_3AlF_6$ | Impurities in cryolite, percent | | | |
|---|---|---|---|---|---|
| | | $SiO_2$ | $P_2O_5$ | Ca | Mg |
| Ion-exchanged water | Crude $Na_3AlF_6$ | 1.00 | 0.10 | 0.02 | 0.01 |
| | Refined $Na_3AlF_6$ | 0.13 | 0.01 | 0.02 | 0.01 |
| Underground water | Crude $Na_3AlF_6$ | 2.00 | 0.15 | 0.10 | 0.05 |
| | Refined $Na_3AlF_6$ | 0.40 | 0.03 | 0.20 | 0.10 |

As is clear from this table, contents of impurities in lots of cryolite obtained at different stages of production vary with the quality of water used.

As a result of research on effects of inorganic substances contained in water used, the inventor has confirmed that when cryolite is synthesized according to the method of this invention, such inorganic substances as calcium and magnesium, if allowed to coexist with F ion, form $NaF.CaF.AlF_3$ and $NaF.MgF.AlF_3$, which are less soluble than cryolite, and cause them to be embraced in cryolite.

When synthetic cryolite containing silicic acid and phosphorus pentoxide at relatively high concentrations is subjected to the treatment with boiling water for the removal of impurities, the aforementioned $NaF.CaF.AlF_3$ and $NaF.MgF.AlF_3$ make the elutriate of impurities extremely difficult.

The quality of water being used thus has a serious effect on the purity of cryolte. It is, therefore, desirable to use water of good quality containing impurities at as low concentrations as permissible to minimize the effect of water quality. In obtaining water of good quality, a common practice is to refine water. This method, however, requires huge equipment and operating costs and eventually proves highly expensive.

FIG. 2 represents one process diagram of a method for manufacturing cryolite with high purity by using water of low quality containing relatively large amounts of calcium and magnesium.

Referring to FIG. 2, water 12 of low quality is supplied via a water pipe to the stage 5 where crude cryolite is subjected to the treatment with boiling water. The cryolite synthesized at a fixed temperature is refined and the refined cryolite 7 is separated by filtration 6. The resultant filtrate is collected via a pipe 19 into a reservoir 16, from which the filtrate is delivered as a dissolving liquid to the stage where silicofluoric acid gas 13 is dissolved for the production of hydrosilicofluoric acid 1 and as a diluent to the stage where dilution is effected on sodium aluminate 2 obtained by the reaction of aluminum hydroxide 14 and sodium hydroxide 15. The raw materials 1 and 2 are diluted with the aforementioned liquid in circulation to their respective concentrations and instilled at fixed rates into the synthesizing device to permit cryolite to be formed at a reaction temperature not exceeding 55° C. Thereafter, reaction product 3 is separated into cryolite and filtrate 9 by filtration 4, with the filtrate discarded. The crude cryolite separated by filtration is refined by the treatment 5 with boiling water using a fresh supply of low-quality water 12, and the refined cryolite 7 is separated by filtration 6, dried and heated to afford cryolite as a final product 8. The filtrate resulting from the separation at the stage 5 of boiling water treatment is forwarded via a pipe 19 to the reservoir 16, from which it is delivered as mentioned previously to serve the purposes of diluting raw materials and synthesizing crude cryolite. Since minute amounts of calcium and magnesium do not cause any interference where cryolite is used for the electrolysis of aluminum, water of low quality is used first at the stage of boiling water treatment so that calcium and magnesium contained in service water are transferred to be contained in the refined cryolite. The liquid to be circulated contains calcium and magnesium at extremely low concentrations. When this liquid is supplied to the raw materials and to the stage of synthesis of crude cryolite, the crude cryolite to be synthesized contains calcium, magnesium and other foreign compounds at so minute concentrations that these impurities will produce no adverse effect on the elutriation of silicic acid and phosphorus pentoxide in the course of boiling-water treatment of synthesized cryolite.

Furthermore, the liquid thus circulated is separated by filtration from the synthesized cryolite at the stage of crude formation of cryolite, discarded and constantly replenished with fresh supply of water. Consequently, it does not happen that the concentrations of silicic acid and phosphorus pentoxide will rise in the liquid in circulation.

Since the cryolite elutriated at the time of boiling water treatment is recovered at the stage of synthesis by putting to re-use the water separated by filtration at the stage of boiling water treatment, the yield is improved by about 10%. Even in the case of water of high quality, therefore, it is more advantageous to employ the method of liquid circulation as illustrated in FIG. 2.

The foregoing description has presumed that the cryolite has the same concentration in the process of synthesis as in the process of refining. In cases where the cryolite has different concentrations at the two process stages, water of high purity may be supplied to the raw materials and to the stage of synthesis of crude cryolite or the filtrate resulting from the boiling water treatment may be stored temporarily in the reservoir to suit the occasion.

As mentioned above, the present invention enables cryolite with high purity to be manufactured directly by using, as the starting material, hydrofluoric acid containing phosphorus pentoxide silicic acid and other similar impurities, hydrosilicofluoric acid, or a mixture of such acids. The manufacture of cryolite with high purity can be accomplished easily even where the water to be added in the process of reaction contains impurities, particularly, calcium and magnesium.

DESCRIPTION OF PREFERRED EMBODIMENTS

The following examples are further illustrative of this invention, and it will be understood that the invention is not limited thereto.

EXAMPLE 1

Into a container holding 30 l. of water, hydrosilicofluoric acid ($H_2SiF_6$ 5%, and $P_2O_5$ 0.1%) recovered from the process of phosphorus pentoxide concentration and 5% sodium aluminate having Na/Al molar ratio of 3/1 equalling the composition of sodium-aluminum fluoride were simultaneously instilled at an equal rate of 1.6 l./min. while under agitation, with the pH value maintained about 4.5 and the reaction temperature in the range of 30-35° C. After 20 l. each of the reactants had been instilled, the agitation was continued for about 10 minutes. $Na_3AlF_6$ produced consequently was filtered to afford crude cryolite. This crude cryolite was found to contain $SiO_2$ at 1.05% and $P_2O_5$ at 0.058%, with the yield of synthesis at 98%.

The said crude cryolite was boiled with 27 l. of water for one hour, filtered, dried and thereafter heated at 300° C. to afford 1.24 kg. of product. This product was found to contain $SiO_2$ at 0.11% and $P_2O_5$ at 0.007%. The yield of refining was found to be 99%.

EXAMPLE 2

The water containing the following impurities at the indicated concentrations was used. 30 l. of the filtrate from the stage of boiling water treatment was placed in a reactor. Hydrosilicofluoric acid ($H_2SiF_6$ 5%, $SiO_2$ 0% and $P_2O_5$ 0.1%) recovered from the stage of phosphorus pentoxide concentration and sodium aluminate having Na/Al mole ratio of 3/1 equalling the composition of sodium-aluminum fluoride were instilled thereto at an equal rate of 1.6 l./min. while under agitation, with the pH value of the reaction solution maintained at 4.5 and the temperature at 31–35° C. Thus, there was obtained cryolite.

The cryolite was found to contain impurities as follows.

|  | Percent |
|---|---|
| $SiO_2$ | 1.00 |
| $P_2O_5$ | 0.05 |
| Ca | Trace |
| Mg | Trace |

The yield to synthesis was found to be 98.5%.

Then, this crude cryolite was boiled with the aforementioned service water for one hour and subsequently filtered to afford refined cryolite. The refined cryolite was found to contain $SiO_2$ at 0.15%, $P_2O_5$ at 0.012%, Ca at 0.1% and Mg at 0.05%. The yield of refined cryolite was 95%.

By contrast, the refined cryolite obtained according to the process illustrated in FIG. 1 while using the same service water and carrying out the synthesis under the same conditions was found to contain $SiO_2$ at 0.4%, $P_2O_5$ at 0.03%, with the yield of refined cryolite at 90%.

EXAMPLE 3

Into a container holding 30 l. of water, a mixture of hydrofluoric acid with silicofluoric acid recovered from the process of phosphorus pentoxide concentration (HF 2.5%, $H_2SiF_6$ 2%, and $P_2O_5$ 0.04%) and 5% sodium aluminate having Na/Al mole ratio of 3/1 were simultaneously instilled at an equal rate of 1.6 l./min. while under agitation, with the pH value maintained about 4.5 and the reaction temperature in the range of 30–35° C. After 20 l. each of the reactants had been instilled, the agitation was continued for 10 minutes. The cryolite formed consequently was filtered to afford crude cryolite.

The crude cryolite was found to contain $SiO_2$ at 0.74%, $P_2O_5$ at 0.04%, and $Fe_2O_3$ at 0.045%, with the yield of synthesis at 97%.

The said crude cryolite was boiled with 27 l. of water for one hour, filtered and heated at 300° C. to afford 1.28 kg. of product. This product was found to contain $SiO_2$ at 0.07%, $P_2O_5$ at 0.005% and $Fe_2O_3$ at 0.010%. The yield of refining was 91%.

Although the working examples illustrate batchwise operations, this invention also enables the synthesis to be accomplished by continuous operation.

What is claimed is:

1. A method for preparing highly pure cryolite which method comprises;
   (A) reacting an acid reactant selected from the group consisting of hydrofluoric acid, hydrosilicofluoric acid and a mixture of said acids with sodium aluminate reactant having an aluminum component of the sodium aluminate of the order of, but not in excess of, a ratio of aluminum/sodium of 1:3, in aqueous solution at a temperature in the range of from about 10° C. to about 55° C., and a pH in the range of 3 to 6.5, said acid reactant containing impurities comprising phosphoric acid, silicic acid, sulfuric acid and iron; said acid reactant and aluminate reactant being present in amounts sufficient to produce 30 g./l. to 50 g./l. of cryolite per liter solution in 5 to 20 minutes of reaction;
   (B) filtering the resultant solution from Step (A) and recovering crude cryolite;
   (C) subjecting the recovered crude cryolite from Step (B) to boiling water; and
   (D) filtering the resultant boiling water solution of Step (C) and recovering cryolite of high purity having a $SiO_2$ content of not more than 0.15% and a $P_2O_5$ content of not more than 0.009%.

2. The method of claim 1 wherein the filtrate from Step (D) is recycled to the reacting Step (A).

References Cited

UNITED STATES PATENTS

| 2,943,914 | 7/1960 | Moser | 23—88 |
| 2,058,075 | 10/1936 | Gaither | 23—88 |
| 2,996,355 | 8/1961 | Kamlet | 23—88 |
| 3,049,405 | 8/1962 | Trupiano et al. | 23—88 |
| 3,493,330 | 2/1970 | Vancil et al. | 23—88 |
| 3,207,575 | 9/1965 | Garing et al. | 23—88 |
| 2,963,344 | 12/1960 | Tarbutton et al. | 23—88 |
| 2,981,598 | 4/1961 | Tarbutton et al. | 23—88 |

FOREIGN PATENTS

| 658,219 | 2/1963 | Canada | 23—88 |

EDWARD STERN, Primary Examiner

U.S. Cl. X.R.

23—182 R